June 2, 1953  C. J. GREEN  2,640,300
GRINDING MACHINE

Filed Feb. 18, 1952  5 Sheets-Sheet 1

INVENTOR.
CLARENCE J. GREEN
BY
Harold W. Eaton

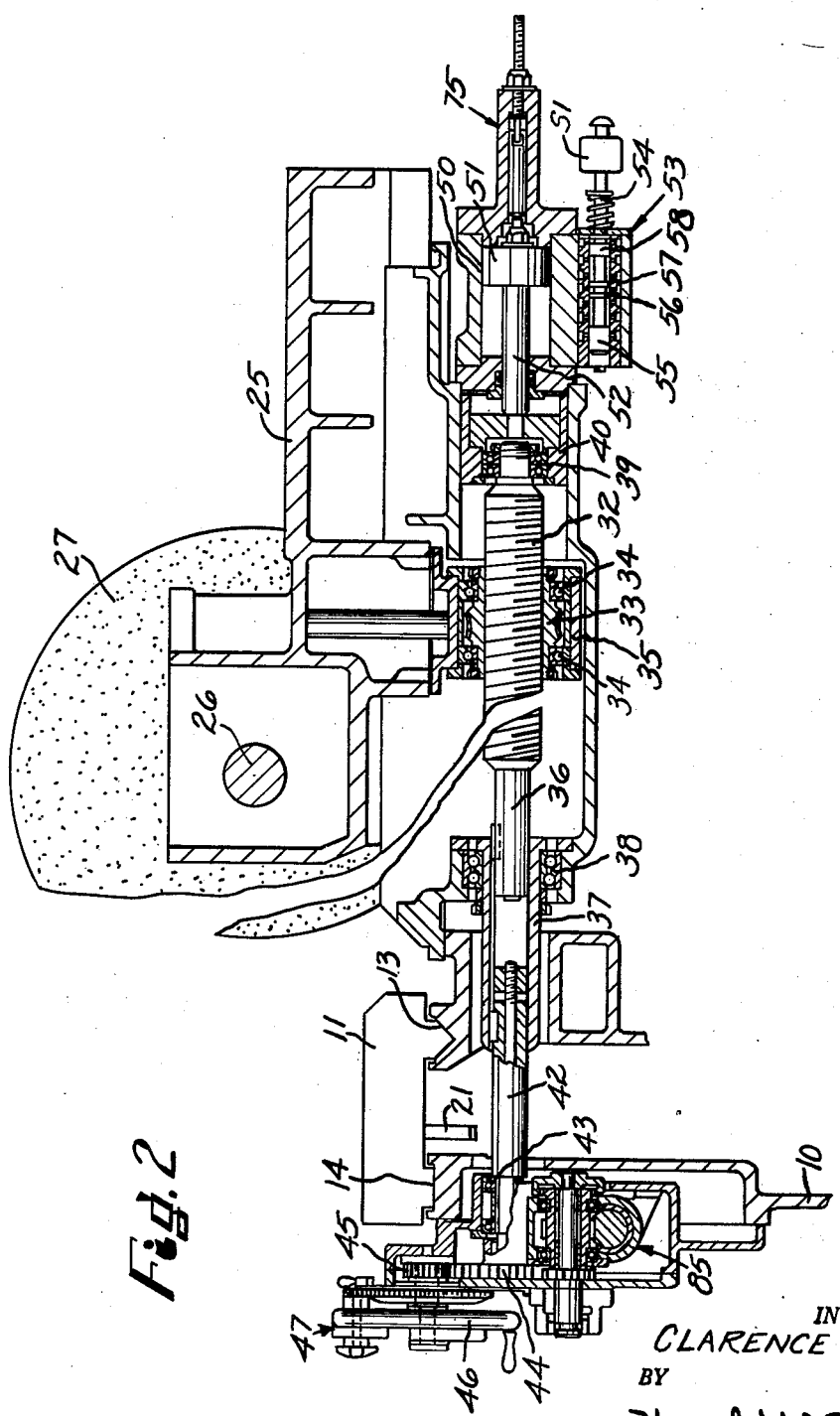

INVENTOR.
CLARENCE J. GREEN
BY
Harold W. Eaton

June 2, 1953

C. J. GREEN 2,640,300

GRINDING MACHINE

Filed Feb. 18, 1952

INVENTOR.
CLARENCE J. GREEN
BY
Harold W. Eaton

June 2, 1953     C. J. GREEN     2,640,300
GRINDING MACHINE
Filed Feb. 18, 1952     5 Sheets-Sheet 5
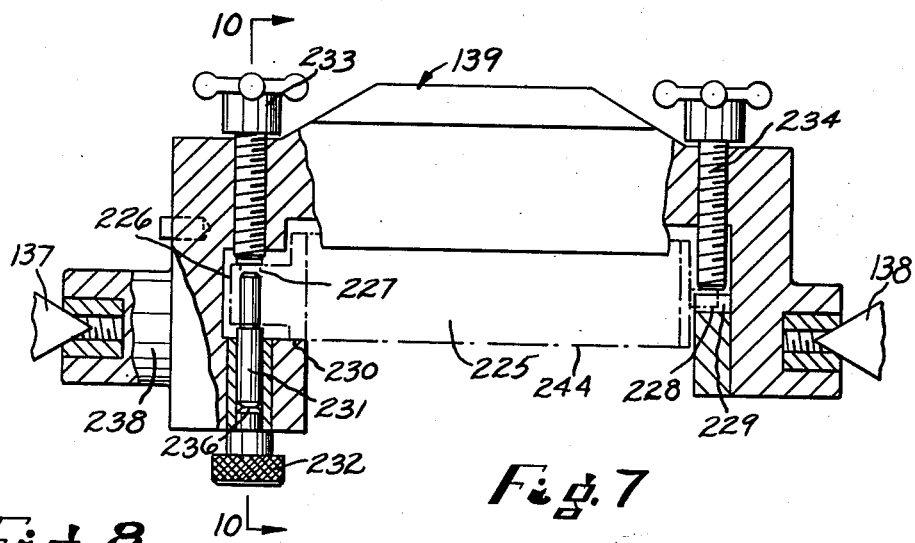
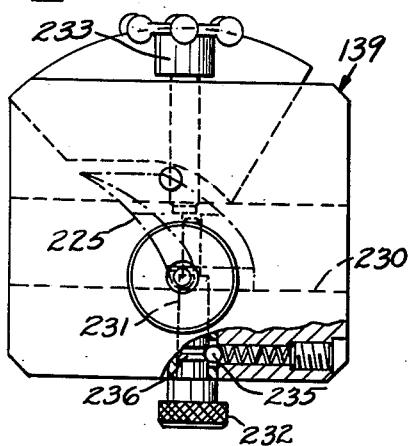
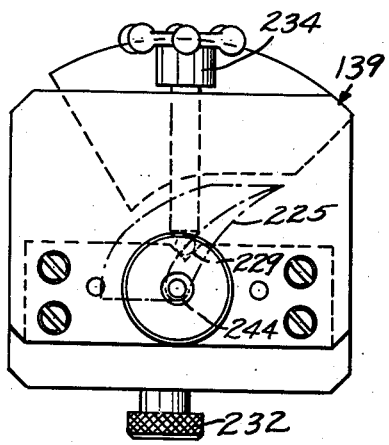
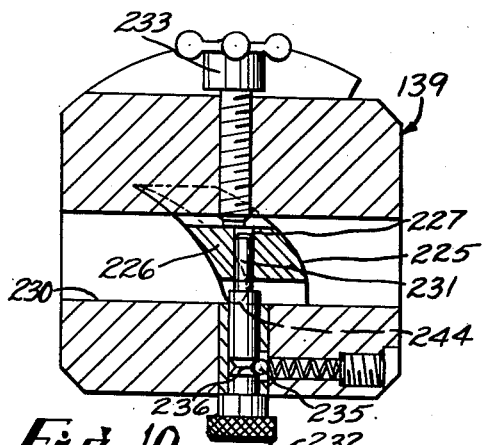
INVENTOR.
CLARENCE J. GREEN
BY
Harold W. Eaton Patented June 2, 1953

2,640,300

UNITED STATES PATENT OFFICE 2,640,300

GRINDING MACHINE

Clarence J. Green, Worcester, Mass., assignor to Norton Company, Worcester, Mass., a corporation of Massachusetts Application February 18, 1952, Serial No. 272,202

7 Claims. (Cl. 51—94)

The invention relates to grinding machines and more particularly to a machine for grinding partial cylindrical surfaces.

One object of the invention is to provide a simple and thoroughly practical grinding machine for grinding a partial cylindrical surface on a work piece. Another object is to provide a fluid motor actuated work support to oscillate a work holder to facilitate grinding a partial cylindrical surface on a work piece. Another object is to provide an electrically controlled mechanism which is actuated by and in timed relation with the rotary motion of the work support to control the direction of movement of the work. Another object is to provide a control mechanism for the work oscillation motor which is actuated by and in timed relation with the rapid approach and receding motion of the grinding wheel. A further object is to provide an electrically actuated hydraulically operated control valve for the work oscillation motor which is operated in timed relation with the wheel feed controlling mechanism. Other objects will be in part obvious or in part pointed out hereinafter.

The invention accordingly consists in the features of construction, and arrangements of parts, as will be exemplified in the structure to be hereinafter described and the scope of the application of which will be indicated in the foregoing claims.

In the accompanying drawings, in which is shown one of various embodiments of the mechanical features of this invention, Fig. 1 is a front elevation of the improved grinding machine;

Fig. 2 is a cross sectional view, on an enlarged scale, through the grinding wheel feeding mechanism;

Fig. 7 is an enlarged view, partly in section, of the work holder;

Fig. 8 is a left hand end elevation of the work holder as shown in Fig. 7.

Fig. 9 is a right hand end elevation of the work holder as shown in Fig. 7; and

Fig. 10 is a cross sectional view, taken approximately on the line 10—10 of Fig. 7, through the work holder.

Figure 1:
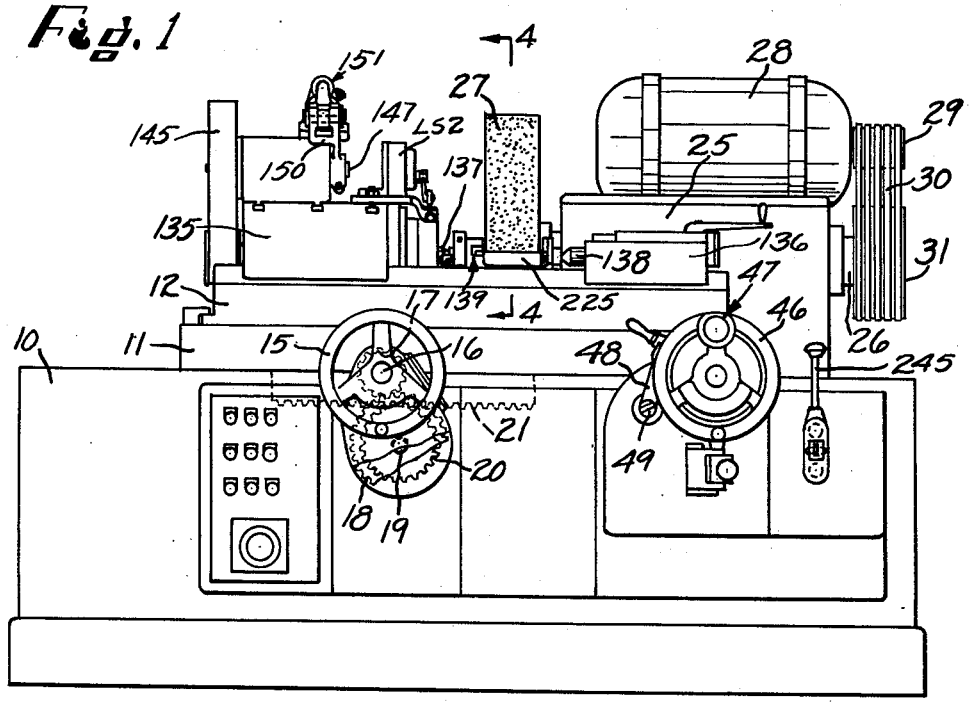

A grinding machine has been illustrated in the drawings comprising a base 10 which supports a longitudinally movable work table 11. The table 11 supports a swivel table 12 which in turn supports a rotatable work supporting and driving mechanism to be hereinafter described. The table 11 is arranged to slide longitudinally on a V-way 13 and a flat way 14 formed on the upper portion of the base 10.

A manually operable table traverse mechanism is provided for traversing the table 11 longitudinally to facilitate positioning a work piece to be ground into operative relation with the grinding wheel to be hereinafter described. This mechanism may comprise a rotatable hand wheel 15 mounted on the outer end of a shaft 16. The shaft 16 supports a gear 17 which meshes with a gear 18 supported on a rotatable shaft 19. The shaft 19 is provided with a gear 20 which meshes with a rack bar 21 depending from the under side of the table 11.

The base 10 also serves as a support for a transversely movable wheel slide 25 which is arranged to slide transversely on the usual flat and V-way (not shown) formed on the upper portion of the base 10. The wheel slide 25 supports a rotatable wheel spindle 26 in suitable bearing (not shown). The spindle 26 serves as a support for a grinding wheel 27. A suitable driving mechanism is provided for rotating the wheel spindle 26 and the grinding wheel 27 comprises an electric motor 28 mounted on the upper portion of the wheel slide 25. The motor 28 is provided with a multiple V-grooved pulley 29 which is connected by multiple V-belts 30 with a multiple V-grooved pulley 31 mounted on the right hand end of the wheel spindle 26 (Fig. 1).

A suitable feeding mechanism is provided for feeding the grinding wheel slide 25 and the grinding wheel 27 transversely. This mechanism may comprise a rotatable feed screw 32. A feed nut 33 meshes with a feed screw 32 which is supported on spaced anti-friction bearings 34 which are in turn supported by a housing 35 fixedly mounted on the under side of the wheel slide 25. The feed screw 32 is provided with a reduced cylinder end portion 36 which is slidably keyed within a rotatable sleeve 37. The sleeve 37 is journalled in bearings 38 to form a rotatable support for the left hand end of the feed screw 32 (Fig. 2). The right hand end of the feed screw 32 is supported on an anti-friction bearing 39 carried by a slidably mounted sleeve 40. The left hand end of a rotatable shaft 42 is journalled on bearings 43 and the right hand end thereof is slidably keyed within the sleeve 37. A gear 44 is mounted on the left hand end of the shaft 42 and meshes with a gear 45 which is connected to rotate with a feed wheel 46. The feed wheel 46 is provided with a micrometer set adjusting mechanism 47. A pivotally mounted stop pawl 48 is supported on a stud 49 on the front end of the machine base 10. The pawl 48 is arranged to be engaged by a stop abutment (not shown) on the feed wheel 46 to limit the infeeding movement of the grinding wheel. It will be readily apparent from the foregoing disclosure that a rotary motion of the hand wheel 46 will be imparted through the mechanism just described to cause a rotary motion of the feed screw 32 and a transverse feeding of the wheel slide 25. The direction of rotation of the feed wheel 46 serving to determine the direction of movement of the wheel slide 25.

A rapid positioning mechanism is provided for rapidly moving the wheel slide 25 and the grinding wheel 27 to and from an operative position. This mechanism is preferably a hydraulically operated mechanism comprising a cylinder 50 which is fixedly supported relative to the base 10. The cylinder 50 contains a slidably mounted piston 51 which is connected to one end of a piston rod 52. The other end of the piston rod 52 is connected to the slidably mounted sleeve 40. It will be readily apparent from the foregoing disclosure that movement of the piston 51 within the cylinder 50 will impart an axial movement to the feed screw 32 to cause a rapid traverse of the wheel slide 25.

Figure 3:
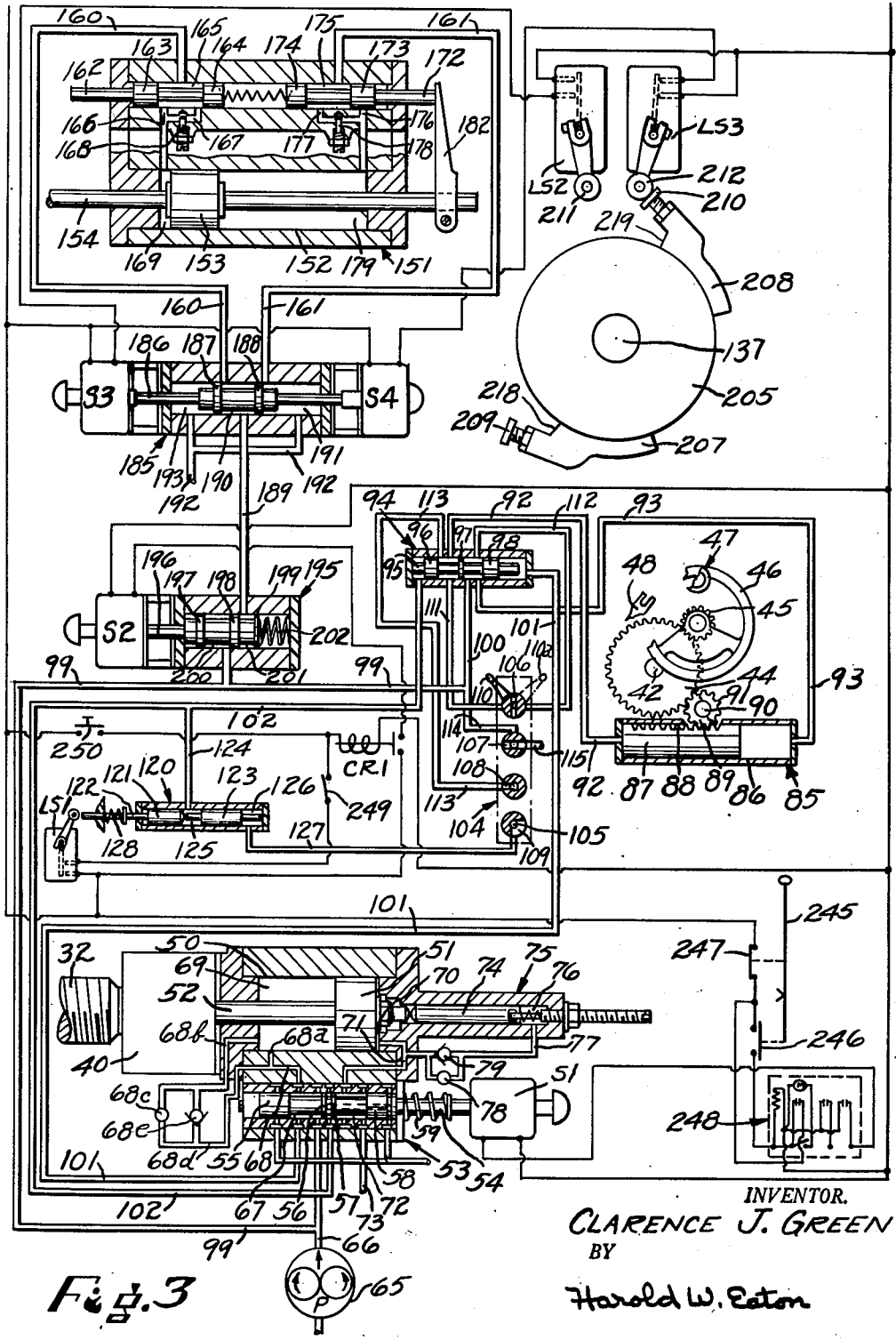
Fig. 3 is a combined electrical and hydraulic diagram of the actuating mechanism and of the control therefor.

A control valve 53 is provided for controlling the admission to and exhaust of fluid from the cylinder 50. The valve 53 is preferably a piston type valve comprising a valve stem 54 having a plurality of valve pistons 55, 56, 57, and 58 formed integrally therewith. A compression spring 59 is provided normally to maintain the valve stem 54 in a right hand end position with the valve pistons 55, 56, 57, and 58 positioned as illustrated in Fig. 3. A solenoid S1 is provided which when energized serves to shift the valve stem toward the left (Figs. 2 and 3) to position the valve pistons 55, 56, 57, and 58 so as to cause a rapid approaching movement of the wheel slide 25.

A fluid pressure system is provided for supplying fluid under pressure comprising a motor driven fluid pump 65 which draws fluid from a suitable source of supply and forces fluid under pressure through a pipe 66 to the control valve 53. Fluid under pressure in the pipe 66 enters a valve chamber 67 formed between the valve pistons 55 and 56 and passes through a passage 68 into a cylinder chamber 69 to cause the piston 55 to move towards the right (Figs. 2 and 3). During this movement of the piston 51 fluid within a cylinder chamber 70 may exhaust through a passage 71, through a valve chamber 72 and out through an exhaust pipe 73. Movement of the piston 51 toward the right serves to cause the wheel slide 25 and the grinding wheel 27 to move rearwardly to an inoperative position.

When it is desired to cause a rapid approaching movement of the wheel sleeve 25 and the grinding wheel 27, the solenoid S1 is energized to shift the valve stem 54 toward the left so that fluid under pressure from the pipe 66 enters the valve chamber 72 and passes through the passage 71 into the cylinder chamber 70 so as to cause the piston 51 to move toward the left thereby applying a rapid approaching movement to the wheel slide 25 and the grinding wheel 27. During this approaching movement fluid within the valve chamber 69 may exhaust through a passage 68 into the valve chamber 67 and exhaust through a pipe 74.

It is desirable to slow down the rapid approaching movement of the piston 51 before it reaches the end of its movement toward the left. This is accomplished by providing two ports 68a and 68b. The port 68a allows substantially unrestricted exhaust of fluid through the passage 68. As the piston 51 starts its movement toward the left, fluid may exhaust through the port 68a and also through the port 68b through a throttle valve 68c and a pipe 68d through the passage 68 to control the rapid approaching movement of the wheel slide 25 and the grinding wheel 27. During the movement of the piston 51 toward the left, the piston 51 covers the port 68a before it reaches the end of its stroke after which fluid within the cylinder chamber must exhaust through the port 68b and through the throttle valve 68c which is set to slow down the rapid approaching movement of the piston 51 before it reaches the end of its stroke. A ball check valve 68e is provided between the pipe 68d and the port 68b which is arranged to allow substantially unrestricted flow of fluid into the cylinder chamber 69 when the control valve 53 is reversed.

It is similarly desirable to cushion the rearward movement of the piston 51 when the grinding wheel 27 and the wheel slide 25 are moved rapidly to a rearward or inoperative position. This is preferably accomplished by the right hand end of the piston rod 52 engaging a dash pot piston 74. The dash pot piston 74 is slidably mounted within the dash pot 75. During the rearward movement of the piston 51, that is, toward the right (Fig. 3), a rapid movement is obtained due to free exhaust of the fluid through the passage 71 until the right hand end of the piston rod 52 engages the dash pot piston 74. When the piston rod 52 moves into engagement with the dash pot piston 74, continued movement of the piston is slowed down by fluid within a dash pot chamber 76 which may exhaust through a passage 77, through a throttle valve 78 into the passage 71. The rate of slow-down movement of the piston 51 is determined by the setting of the throttle valve 78. A ball check valve 79 is provided between the passage 77 and the passage 71 to facilitate allowing an unrestricted flow of fluid into the dash pot chamber 76 when the approaching movement of the piston 65 is started in order to facilitate resetting the dash pot piston 74. The mechanism just described serves to control the rapid approaching and receding movement of the wheel slide 25 and the grinding wheel 27.

A feeding mechanism is provided for controlling the feed of the wheel slide 25. This mechanism may comprise a fluid motor 85 including a cylinder 86. The cylinder 86 contains a slidably mounted piston 87 having a rack formed on its upper surface. The rack 88 meshes with a gear 89 mounted on a shaft 90. The shaft 90 also carries a gear 91 which meshes with the gear 44. Fluid under pressure may be passed either through a pipe 92 or a pipe 93 to opposite ends of the cylinder 86 to cause the endwise motion of the piston 87 which is transmitted through the gear mechanism above described to impart a rotary motion to the feed screw 32 to feed the wheel slide 25 and the grinding wheel 27 either toward or from the work piece being ground.

A feed control valve 94 is provided for controlling the admission to and exhaust of fluid from the cylinder 86. The feed control valve 94 is a shuttle-type valve comprising a valve stem 95 having a plurality of spaced valve pistons 96, 97, and 98 formed integrally therewith. As shown in Fig. 3, a pipe 99 conveys fluid under pressure from the pressure pipe 66, through a pipe 100 into a valve chamber formed between the valve pistons 97 and 98. Fluid entering the valve chamber passes through the pipe 93 into the cylinder chamber formed at the right hand end of the cylinder 86 to cause the piston 87 to move toward the left thereby rotating the feed screw 32 so as to cause a rearward movement of the grinding wheel 27 and the wheel slide 25. During movement of the piston 87 toward the left, fluid may exhaust from the left hand end chamber of the cylinder 86 through the pipe 92, through a valve chamber formed between the valve pistons 96 and 97 and passed out through a pipe 113 and exhaust through a selector valve 104 to be hereinafter described.

The shifting movement of the feed control valve 94 is preferably controlled in a timed relation with movement of the control valve 53. A pipe 101 conncets the valve 53 with an end chamber formed at the right hand end of the valve 94. Similarly a pipe 102 connects the control valve 53 with an end chamber formed at the left hand end of the valve 94. In the position of the valve 53 (Fig. 3), fluid under pressure enters the valve chamber 67 passes through the passage 68 causes the rapid rearward movement of the piston 51 and also passes through the pipe 101 to cause the feed control valve stem 95 to move toward the left into the position illustrated in Fig. 3. In this position as above described, fluid passes through the pipe 93 into a cylinder chamber at the right hand end of the cylinder 85 to cause the piston 87 to move toward the left to cause a rearward movement of the wheel slide 25.

When the solenoid S1 is energized to initiate a feeding cycle, the valve stem 54 is moved toward the left (Fig. 3) so that fluid under pressure from the pipe 66 enters the valve chamber 72 and passes through the passage 71 into the cylinder chamber 70 to cause rapid movement of the piston 51 toward the left. At the same time fluid passes through the pipe 102 into the valve chamber at the left hand end of the valve 94 to shift the valve stem 95 toward the right. In this position, fluid under pressure from the pipe 100 passes through the valve chamber formed between the valve pistons 96 and 97 and passes through the pipe 92 into the cylinder chamber formed at the left hand end of the cylinder 86 so as to cause the piston 87 to move toward the right. During the movement of the piston 87 toward the right, the feed screw 32 is rotated in the opposite direction to impart an infeeding movement to the grinding wheel 27 and the wheel slide 25.

The selector valve 104 is a rotary-type valve which serves to render the grinding feeding mechanism manual or automatic as desired. The selector valve 104 is shown diagrammatically in Fig. 3 in which the valve rotor is provided with a central passage 105 and a plurality of spaced radially extending passages 106, 107, 108 and 109. A manually operable control lever 110 is provided for actuating the selector valve 104. As shown in Fig. 3 the selector valve 104 is in a position to produce an automatic actuation of the piston 87 in timed relation with movement of the piston 51. A pair of pipes 111 and 112 are connected between the feed control valve 94 and the selector valve 104. When valve 104 is turned to a manual position, with lever 110 in position 110a, fluid under pressure may pass through the passage 106 and be conveyed to opposite ends of the cylinder 86. A pipe 113 is connected between the feed control valve 94 and the selector valve 104 and as shown in Fig. 3 is arranged to exhaust fluid from the valve chamber located between the valve pistons 96 and 97, through the passage 108 in the selector valve 104, through the central passage 105, through the passage 107 and into an exhaust pipe 115. A pipe 114 is connected between the pipe 100 and the selector valve 104 and is arranged so that when the selector valve 104 is turned to a manual position fluid under pressure from the pipe 99 and the pipe 100 may pass through the pipe 114, through a transverse passage 107, through the central passage 105 from which it is passed to both ends of the cylinder 86.

Fluid under pressure from the central passage 105 in the selector valve 104 is also conveyed through a pipe 127 to a fluid control cylinder 120 for actuating a normally open spaced limit switch LS1. The cylinder 120 contains a pair of slidable pistons 121 and 123. The piston 121 is provided with a piston rod 122 which is normally urged in a right hand direction by a compression spring 128. When fluid under pressure is passed through a pipe 124 into a cylinder chamber 125 or through pipe 127 into a cylinder chamber 126, the piston rod 122 will be moved toward the left (Fig. 3) to actuate the limit switch LS1 which serves to start the motion of the work driving motor in a manner to be hereinafter described.

The swivel table 12 serves as a support for a rotary work support comprising a head stock 135 and a foot stock 136 which are provided with work supporting centers 137 and 138, respectively. The work centers 137 and 138 are arranged to rotatably support a work holder 139 which will be more fully described hereinafter.

Figure 5:
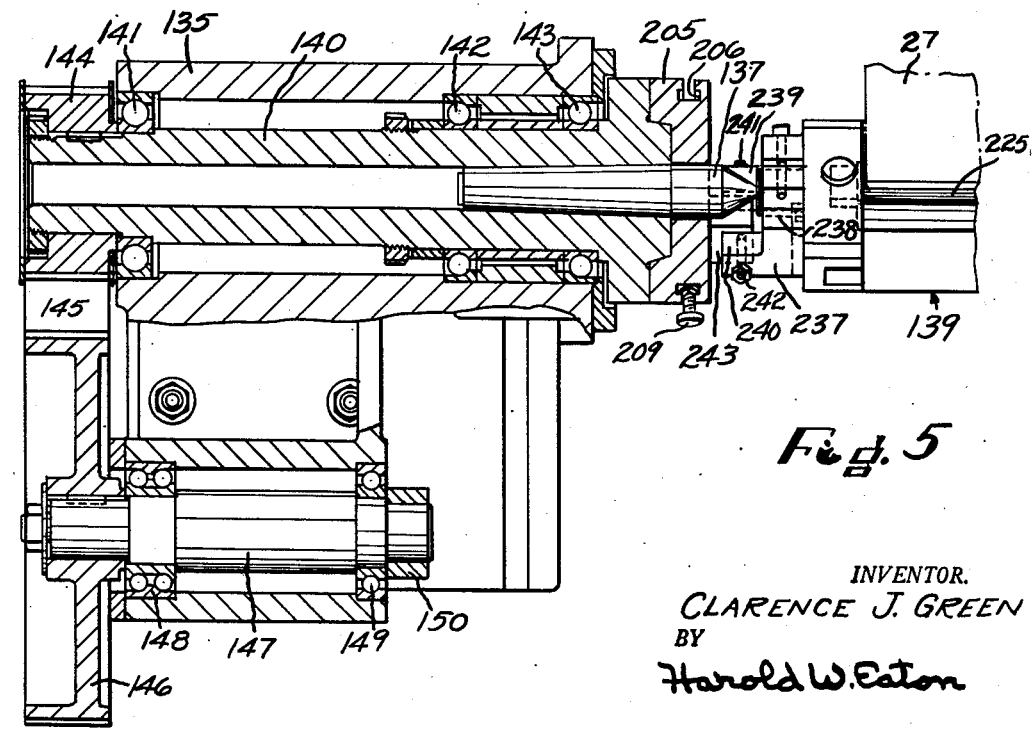
Fig. 5 is a staggered horizontal sectional view, on an enlarged scale, taken approximately on the line 5—5 of Fig. 4, through the work driving head.

The head stock 135 comprises a rotatable spindle 140 which is journalled in spaced anti-friction bearings 141, 142, and 143 (Fig. 5). The left hand end of the spindle 140 is provided with a sprocket 144 which is connected by a cog belt 145 with a sprocket 146 mounted on a rotatable shaft 147. The cog belt 145 is a standard well known belt, such as for example a timing belt manufactured by the L. H. Gilmer Company. The shaft 147 is supported by spaced anti-friction bearings 148 and 149 carried by the head stock 135. A crank arm 150 is mounted on the right hand end of the shaft 147 and serves when oscillated to transmit an oscillating movement to the head stock spindle 140 and also to the work holder 139.

Figure 4:
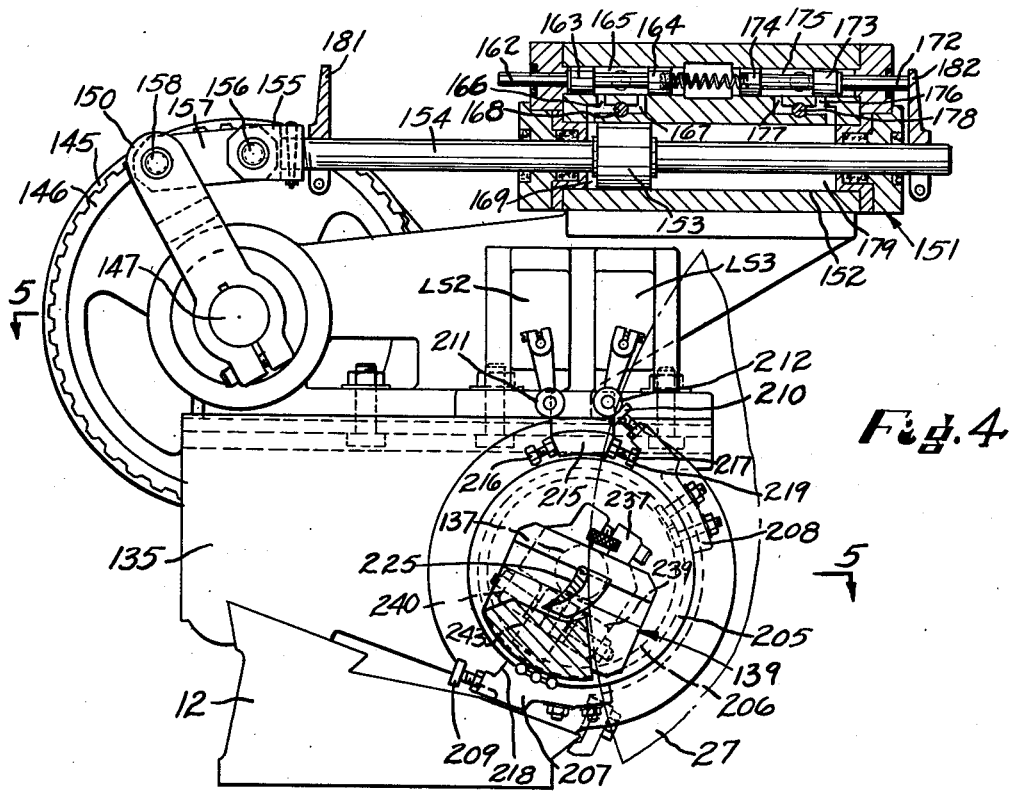
Fig. 4 is a right hand end elevation, on an enlarged scale, taken approximately on the line 4—4 of Fig. 1, partly in section to clarify the illustration.

A fluid motor 151 is provided for imparting an oscillating movement to the crank arm 150. The motor 151 comprises a fluid pressure cylinder 152 having a slidably mounted piston 153 therein. The piston 153 is connected to a double end piston rod 154 (Figs. 3 and 4). A yoked member 155 is mounted on the left hand end of the piston rod 154 and is connected by a stud 156 with a link 157. The link 157 is connected by a stud 158 with the crank arm 150. It will be readily apparent from the foregoing disclosure that when fluid is passed alternately to opposite ends of the cylinder 152 to cause a reciprocatory movement of the piston 153, an oscillating motion will be imparted through the mechanism just described to impart an oscillating movement to the work holder 139 to facilitate grinding a partial cylindrical surface on a work piece being ground. Fluid under pressure from a reversing valve to be hereinafter described is passed through a pipe 160 or a pipe 161 to opposite ends of the cylinder 152.

It is desirable to slow-down the movement of the piston 153 before reversal. This is preferably accomplished by providing a normally operative throttle valve at each end of the cylinder to restrict admission to end exhaust of fluid from the opposite entrance of the cylinder 152 as the piston 153 approaches the end of its reciprocatory stroke. As illustrated in Figs. 3 and 4, a piston type valve is provided comprising a valve stem 162 having spaced valve pistons 163 and 164 formed integrally therewith forming a valve chamber 165 and between. When fluid under pressure passes through the pipe 162 into the valve chamber 165, it passes through a passage 166 into a cylinder chamber 169 to cause the piston 153 to move toward the right (Figs. 3 and 4). An adjustable throttle valve 168 is provided so that when the valve stem 162 is moved toward the right and the valve piston 163 covers the passage 166, fluid may pass through a port 167, through the throttle valve 168 into the cylinder chamber 169 to start movement of the piston 153 toward the right.

A similar valve is provided at the other end of the cylinder 152 comprising a valve stem 172 having spaced valve pistons 173 and 174 formed integrally therewith forming a valve chamber 175 therebetween. When fluid under pressure is passed through the pipe 161 into the valve chamber 175, it may pass either through a passage 176 or through a port 177 depending upon the position of the valve pistons 173 and 174. As illustrated in Fig. 3, fluid under pressure entering the valve chamber 175 passes through the port 177 and through a throttle valve 178 into the passage 176 and into the cylinder chamber 177.

The valves 162 and 172 are preferably controlled by and in timed relation with the movement of the piston 153. The piston rod 154 carries a pair of adjustable dogs 181 and 182 which are arranged to move into engagement with valve stems 162 and 172 respectively. It will be readily apparent from the foregoing disclosure that when the piston 153 is reciprocatory within cylinder 152, the dogs 181 and 182 will successively engage and actuate the valves 162 and 172 respectively. As shown in Fig. 3 fluid under pressure passing through the pipe 160, through the valve chamber 165, through the passage 166 into the cylinder chamber 169 starts movement of the piston 153 toward the right. Fluid within the cylinder chamber 179 may exhaust through the passage 176, through the throttle valve 178, through the port 177, through the valve chamber 175 and out through the pipe 161. It will be readily apparent from this arrangement that the initial movement of the piston 153 toward the right will be at a slow rate controlled by the setting of the throttle valve 178. As the piston rod 154 moves toward the right, the released compression of a spring 180 serves to move the valve stem 172 toward the right so as to open the passage 176 directly to the valve chamber 175 so that unrestricted exhaust or fluid from the cylinder chamber 179 may be obtained in order to facilitate movement of the piston at a normal rate. The piston 153 continues its movement toward the right (Fig. 4) at a normal rate until the dog 181 engages the valve stem 162 and moves it toward the right to cut off the passage of fluid through the passage 166. The flow of fluid under pressure from the pipe 160 into the valve chamber 165 thereafter passes through the port 167 and through the throttle valve 168 so as to cut down the passage of fluid into the cylinder chamber 169 and thereby to slow-down the rate of movement of the piston 153 as it approaches the right-hand end of its stroke. By the provision of the slow-down valve above described, a slowing-down movement of the piston 153 is obtained before reversal at each end of the stroke of the piston 153 and a slow starting of the piston in the reverse direction is also obtained. It will thus be apparent that deceleration and acceleration of the piston movement is obtained at each end of its stroke.

A suitable reversing mechanism is provided for controlling the admission to an exhaust or fluid from the fluid motor 151. This mechanism may comprise a solenoid actuated reversing valve 185 comprising a valve stem 186 having a pair of spaced valve pistons 187 and 188 formed integrally therewith. A pressure pipe 189 conveys fluid under pressure to a valve chamber 190 located between the valve pistons 187 and 188. In the position illustrated in Fig. 2, fluid entering the valve chamber 190 may pass through the pipe 160 into the cylinder chamber 169. In this position of the valve, fluid exhausting through the pipe 161 passes through a valve chamber 191 and out through an exhausting pipe 192.

A pair of solenoids S3 and S4 are provided at opposite ends of the valve 185 for shifting the valve stem 186 endwise so as to reverse the flow of fluid to the fluid motor 151. As illustrated in Fig. 3, solenoid S4 is shown energized so that the valve stem 186 is in its left hand end of position. When solenoid S3 is energized, the valve stem 186 is shifted toward the right so that fluid under pressure in the valve chamber 190 may pass through the pipe 161 in the cylinder chamber 179 to cause the piston 153 to move toward the left. During this movement fluid exhausting from the cylinder chamber 169 passes through the pipe 160, through a valve chamber 193 and out through the exhaust pipe 192.

It is desirable to provide a suitable control mechanism so that the fluid motor 151 may be started and stopped automatically in timed relation with the other mechanisms of the machine. This is preferably accomplished by a solenoid actuated start-stop valve 195 which comprises a valve stem 196 having a plurality of spaced valve pistons 197, 198 and 199 formed integrally therewith. The valve pistons 197, 198, and 199 form a series of valve chambers 200 and 201. A compression spring 202 serves normally to hold the valve stem 196 in its left hand end position. A solenoid S2 is provided which when energized serves to shift the valve stem 196 toward the right so that the fluid under pressure from the pressure pipe 99 may pass into the valve chamber 200 and through the pipe 189 to the reversing valve 185. It will be readily apparent from the foregoing disclosure that by timing the energization of the solenoid S2, the fluid motor 151 may be started and stopped automatically in a manner to be hereinafter described.

An electrically operated control mechanism is provided for adjustably controlling the extent of oscillation of the headstock spindle 140. This mechanism may comprise a plate 205 which is fixedly mounted on the right hand end of the spindle 140 (Fig. 5). The plate 205 is provided with an annular T-slot 206 which supports a pair of adjustable reversing dogs 207 and 208. Clamping screws are provided for clamping the dogs 207 and 208 in the desired adjusted position. The dogs 207 and 208 are provided with adjustable actuating screws 209 and 210 which are arranged to engage actuating rollers 211 and 212 of a pair of limit switches LS2 and LS3 (Fig. 5). It will be readily apparent from the foregoing disclosure that rotary motion of the spindle 140 caused by movement of the piston 153 will be controlled by the limit switches LS2 and LS3 which are operatively connected to energize the solenoid S3 and S4 respectively.

In order to positively limit the rotary motion of the spindle 140, a stop lug 215 is fixedly mounted on the headstock 135 and is provided with a pair of adjustably mounted stop screws 216 and 217 which are arranged to be engaged by stop abutments 218 and 219 formed on the dogs 207 and 208 respectively. It will be readily apparent from the foregoing disclosure that actuation of the limit switches LS2 and LS3 will cause a shifting movement of the reversing valve 165 to change the direction of oscillation of the spindle 140 and the stop screws 216 and 217 and thereafter function positively to stop the movement of the spindle in either direction.

The work holder 139 is arranged to support a jet motor blade 225 having an end portion 226 (Fig. 7) which is provided with a hole 227. The other end of the blade 225 to be ground is provided with a boss 228 which engages a V-shaped notch 229 formed in a portion of the work holder 139. The left hand end of the blade 225 engages a locating surface 230 formed on the holder 139 and serves to locate the left hand end of the blade. A slidably mounted locating stud 231 is provided with an actuating knob 232 and is arranged to be moved into engagement with the hole 227 precisely to locate the blade 225 for a grinding operation. A clamping screw 233 is provided adjacent to the left hand end of the work holder 139 to facilitate clamping the left hand end of the blade in position. A spring pressed ball 235 is provided on the work holder 139 and is arranged to engage V-shaped groove 236 on the stud 231 to maintain the stud in an operative position. A clamping screw 234 is provided adjacent to the right hand end of the work holder 139 to facilitate clamping the boss 228 in engagement with the V-shaped notch 229. As previously explained the work holder 139 after being loaded is supported by the headstock center 137 and the foot stock center 138.

Figure 6:
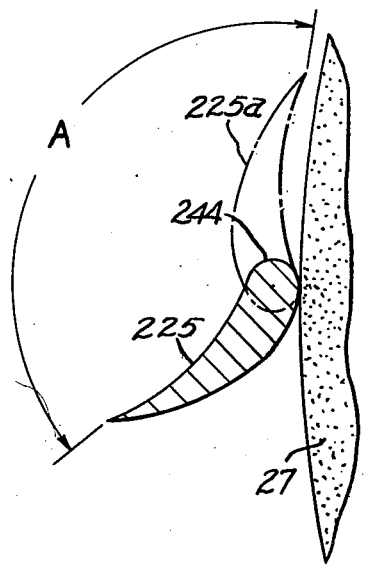
Fig. 6 is a fragmentary view on an enlarged scale showing the path of oscillation of the work piece relative to the grinding wheel.

In order to facilitate driving the work holder 139 an adjustably mounted work driving dog 237 is clamped on a boss 238 on the left hand end of the work holder 139. The driving dog 237 is provided with a pair of spaced projecting arms 239 and 240 each of which is provided with clamping screws 241 and 242 respectively which are arranged to clamp against opposite side faces of a projecting boss 243 formed integral with a plate 205 (Fig. 5). It will be readily apparent from the foregoing disclosure that if the driving dog 237 is precisely located on the holder 139, the path of movement of the blade 225 to be ground may be readily controlled so that the blade will swing from full line position 225 into broken line position 225a (Fig. 6). So as to grind a partial cylindrical surface 244 on the blade 225.

In order to control the cycle of operation, a manually operated cycle control lever 245 is pivotally mounted on the front of the machine base 10. The control lever 245 is arranged to actuate a start switch 246 and a stop switch 247. A manually operative switch 249 is connected between the limit switch LS1 and a relay switch CR1. When the switch 249 is closed, the relay switch CR1 may be controlled by the cycle control lever 245. If the switch 249 is opened, a manual control of the work oscillation may be obtained by manually closing a push button switch 250.

Assuming the switch 249 to be closed, a grinding cycle may be started by manually rocking the cycle control lever 245 in a clockwise direction (Fig. 3) to close the start switch 246. Closing switch 246 serves to energize an electric timer 248 and also to energize the solenoid S1. The timer 248 is operatively connected to control the duration of the grinding cycle. When the solenoid S1 is energized, the valve 53 is shifted toward the left so that fluid under pressure is passed through the pipe 101 into the cylinder chamber 125 to move the piston 121 toward the left so as to actuate the limit switch LS1. The closing of the limit switch LS1 serves to energize the relay switch CR1 which closes a circuit to energize the solenoid S2 thereby shifting the start-stop valve 195 to pass fluid under pressure to the fluid motor 151 thereby starting oscillation of the headstock spindle 140. During the shifting movement of the valve 53 toward the left fluid first passes through the pipe 102 after which fluid under pressure is passed through the passage 71 into the cylinder chamber 70 to cause a rapid movement of the piston 51 toward the left to produce a rapid approaching movement of the wheel slide 25 and the grinding wheel 27.

As previously explained passage of fluid through the pipe 102 serves to shift the feed control valve 94 so as to admit fluid under pressure to the feed motor 85 thereby starting movement of the piston 87 toward the right to impart a rotary motion to the feed screw 32 to advance the wheel slide 25 and the grinding wheel 27 at a rate suitable for controlling the grinding operation on the work piece being ground. The feeding movement of the wheel slide 25 and the grinding wheel 27 will continue until a predetermined time interval has elapsed at which time the timer 248 will open a circuit thereby deenergizing the solenoid S1 so that the released compression of the spring 59 will shift the valve 53 toward the right into the position illustrated in Fig. 3. When the valve 53 moves into this position, fluid will be exhausted from the cylinder chamber 125 thereby releasing the compression of the spring 128 to allow the limit switch LS1 to open thereby deenergizing relay switch CR1 to deenergize the solenoid S2 thereby cutting-off the flow of fluid under pressure to the fluid motor 151 to stop the oscillation of the work holder 139 and the headstock spindle 140. At the same time, the valve 53 will pass fluid under pressure through the passage 68 to cause a rapid rearward movement of the piston 51 which causes the wheel slide 25 and the grinding wheel 27 to move rearwardly to an inoperative position. When the control valve 53 reaches the position illustrated in Fig. 3 fluid under pressure is passed through the pipe 101 to shift the feed control valve 94 toward the left thereby reversing the flow of fluid to the feed motor 85 to cause the piston 87 to move toward the left into the position illustrated in Fig. 3. This movement of the piston 87 serves to rotate the feed screw 32 in the reversing direction to reset the feed mechanism for the next grinding operation.

The machine has been illustrated as set up for grinding a semi-cylindrical surface 244 on a blade 225 while the blade is swung, an angle A (Fig. 6) has control by the setting of the dogs 207 and 208. It will be readily apparent that by adjusting the position of the dogs 207 and 208 relative to the blade 205, arcuate surfaces of varying lengths may be readily ground.

The operation of this improved grinding machine will be readily apparent from the foregoing disclosure assuming all of the mechanisms to have been previously adjusted, a work piece 225 is mounted in position in the work holder 139 as above described. The work holder 139 is then positioned in the machine and is supported by the headstock center 137 and the footstock center 138. The control lever 245 may then be rocked in a clockwise direction (Fig. 3) to close the start switch 246 which serves to start a grinding cycle. The closing of the start switch 246 energizes the solenoid S1 and at the same time energizes the timer 248. Energizing the solenoid S1 shifts the control valve 53 to pass fluid through the pipe 102 into the cylinder chamber 125 to close the limit switch LS1 thereby starting the fluid motor 151 and the oscillation of the headstock spindle 140. At the same time fluid passes through the passage 71 into cylinder chamber 70 to keep a rapid approaching movement of the grinding wheel 27 and the wheel slide 25. When fluid under pressure is passed through the pipe 102 into the cylinder chamber 125, it is also conveyed to the feed control valve 194 to shift the valve stem 95 toward the right (Fig. 3) to start movement of the said piston 87 toward the right thereby imparting a rotary motion to the feed screw 32 to feed the grinding wheel 27 toward the axis of the work piece being ground to grinding semi-cylindrical surface 244 thereon. The infeeding movement, as caused by movement of the piston 87 toward the right, continues until the stop abutment on the feed wheel 46 engages the stop pawl 48. The grinding wheel 27 remains in grinding contact with the work piece 225 until the timer 248 times-out thereby breaking a circuit to deenergize the solenoid S1. Deenergizing the solenoid S1 returns the valve 53 into the position illustrated in Fig. 3 thereby stopping oscillation of the headstock spindle 140, rapidly moving the piston 51 to a rearward or inoperative position, and also for moving the piston 87 toward the left to reset the feeding mechanism for the next grinding cycle. If any time during a grinding cycle, if desired, the cycle may be stopped by rocking the control 245 in a counterclockwise direction to open the stop switch 247 thereby interrupting the time cycle and returning the various mechanisms to the initial positions as in Fig. 3.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is thereby understood that all matter hereinbefore set forth or shown in the accompanying drawings is to be interpreted as illustrative and not in a limiting sense.

I claim:

1. In a grinding machine having a transversely movable rotatable grinding wheel, means to feed the wheel transversely to produce a grinding feed, a longitudinally movable table, means to traverse said table longitudinally, a rotatable work support including a head stock and a foot stock center rotatably to support a work piece on said table, a work driving mechanism including a fluid motor arranged to oscillate a work piece continuously through a partial rotation, a reversing valve for controlling the fluid motor, and means actuated by and in timed relation with the rotary motion of the head stock spindle to control the reversing valve and thereby to control the extent of oscillation of the spindle.

2. In a grinding machine, as claimed in claim 1, in combination with the parts and features therein specified in which a pair of limit switches are provided to actuate the reversing valve, and a pair of adjustable dogs carried by the headstock spindle for actuating the limit switches to control the extent of oscillation of the fluid motor.

3. In a grinding machine having a transversely movable rotatable grinding wheel, means including a fluid motor to cause a rapid approaching and receding movement of said wheel, means including a fluid motor to feed the wheel transversely to produce a grinding feed, a rotatable work support including a rotatable headstock spindle and a footstock, a work driving mechanism including a fluid motor to oscillate the spindle continuously through a partial rotation to facilitate grinding a partial cylindrical surface on a work piece, and means including a control valve for controlling all of said fluid motors so as to control the rapid approaching and receding and the grinding feed of said wheel and the oscillation of the headstock spindle.

4. In a grinding machine, as claimed in claim 3, in combination with the parts and features therein specified of a solenoid-actuated reversing valve to control the fluid motor, a pair of limit switches actuated by and in timed relation with the oscillation of the headstock spindle to control said valve so as to control the extent of oscillation spindle, a solenoid-actuated control valve to control the admission of fluid under pressure to said reversing valve, a limit switch to control said latter valve, and fluid actuated means operated by and in timed relation with the feed control valve to start the fluid motor and thereafter to start a rapid approaching movement of the grinding wheel.

5. In a grinding machine, as claimed in claim 3, in combination with the parts and features therein specified of a solenoid-actuated reversing valve to control said fluid motor, a pair of limit switches for actuating said reversing valve, adjustable dogs carried by said spindle which are arranged to actuate said limit switches so as to control the extent of the oscillatory stroke of the said spindle, a solenoid-actuated control valve to control the admission of fluid under pressure to said reversing valve, a limit switch operatively connected to actuate said latter valve, a piston and cylinder to actuate said limit switch, and fluid connections between said cylinder and the said control valve which are arranged to start oscillation of the headstock spindle and thereafter to cause a rapid approach movement of the grinding wheel.

6. In a grinding machine having a transversely movable rotatable grinding wheel, means including a fluid motor to cause a transverse feeding movement of the grinding wheel in either direction, a solenoid-actuated control valve therefor, a rotatable work support including a headstock spindle means including a fluid motor to oscillate said spindle, a control valve therefor to reverse the direction of said motor, means including adjustable dogs rotatable with said spindle to control actuation of said control valve, a solenoid-actuated control valve to control admission of fluid under pressure to said control valve, and a limit switch actuated by and in timed relation with said first solenoid-actuated valve to energize the second solenoid-actuated control valve so as to start oscillation of the spindle before the forward movement of the grinding wheel is started.

7. In a grinding machine having a transversely movable rotatable grinding wheel, means to feed the wheel transversely to produce a grinding feed, a longitudinally movable table, means to traverse said table longitudinally, a rotatable work support on said table including a rotatable headstock spindle, a fluid motor including a piston and cylinder operatively connected to oscillate the head stock spindle continuously through a partial rotation, a reversing valve therefor, an independent valve for controlling the admission to and exhaust from each end of said cylinder, a passage between said valve and the ends of said cylinder to allow unrestricted passage of fluid, an auxiliary passage having a throttle valve therein between each of said valves and the ends of said cylinder, adjustable dogs movable with said piston to actuate said valves to slow down the movement of the piston before it reaches the end of its stroke, and adjustable dogs positively to limit the oscillatory stroke of said spindle in either direction, said throttle valve serving to slow down movement of the piston before the stop screws are engaged by said dogs.

CLARENCE J. GREEN.

References Cited in the file of this patent

UNITED STATES PATENTS

| Number | Name | Date |
|---|---|---|
| 730,445 | Echols | June 9, 1903 |
| 1,515,568 | Fleming et al. | Nov. 11, 1924 |
| 1,873,224 | Shippy et al. | Aug. 23, 1932 |
| 2,077,359 | Flygare | Apr. 13, 1937 |
| 2,247,228 | Flygare | June 24, 1941 |
| 2,427,283 | Hopkins et al. | Sept. 9, 1947 |